March 28, 1967  G. L. VON PRAGENAU  3,310,980
HYDRAULIC SUPPORT FOR DYNAMIC TESTING
Filed June 24, 1964  4 Sheets-Sheet 1

INVENTOR.
GEORGE LANDWEHR VON PRAGENAU
BY
ATTORNEYS

March 28, 1967    G. L. VON PRAGENAU    3,310,980
HYDRAULIC SUPPORT FOR DYNAMIC TESTING
Filed June 24, 1964    4 Sheets-Sheet 2

INVENTOR.
GEORGE LANDWEHR VON PRAGENAU
BY
ATTORNEYS

March 28, 1967  G. L. VON PRAGENAU  3,310,980
HYDRAULIC SUPPORT FOR DYNAMIC TESTING
Filed June 24, 1964  4 Sheets-Sheet 3

INVENTOR.
GEORGE LANDWEHR VON PRAGENAU.
BY
ATTORNEYS

March 28, 1967  G. L. VON PRAGENAU  3,310,980
HYDRAULIC SUPPORT FOR DYNAMIC TESTING
Filed June 24, 1964  4 Sheets-Sheet 4

INVENTOR.
GEORGE LANDWEHR VON PRAGENAU
BY
ATTORNEYS

3,310,980
HYDRAULIC SUPPORT FOR DYNAMIC TESTING
George Landwehr von Pragenau, Huntsville, Ala., assignor to the United States of America as represented by the Administrator of the National Aeronautics and Space Administration
Filed June 24, 1964, Ser. No. 377,780
3 Claims. (Cl. 73—116)

The invention described herein may be manufactured and used by or for the Government of the United States of America without the payment of any royalties thereon or therefor.

This invention relates to a support for the dynamic testing of space vehicles and the like under substantially free flight conditions.

An essential element in the design of large rocket vehicles is their dynamic characteristics under free flight. It is the dynamic characteristics which help to determine the composition of its control system, the design of its body structure, and finally the flight trajectory of the vehicle itself.

Unfortunately, the prediction of realistic vehicle dynamic data is very difficult and often impossible through the use of theoretical analysis. Therefore, resort has recently been tried toward suspending the vehicle by a cable and shaking it to determine its dynamic characteristics. The data obtained, however, from this type suspension system is influenced by the suspension point forces and the resonant frequencies of the cables of the support system. These influences are extremely nonlinear and difficult to account for in the analysis of the test results.

Also, the cable suspension system does not mate easily with test objects such as space vehicles, spacecrafts, and aircraft, because these objects normally have provisions to sit on the ground or on booster stages when not in free flight. Usually, special adapters have to be built to suspend these objects and these adapters disturb the mass distribution of the objects.

Accordingly, it is an object of this invention to provide a support for a test vehicle which approaches free flight conditions.

Another object is to provide a hydraulic support for the full scale testing of a vehicle about any axis and in any direction within a certain range.

Other objects, uses, and advantages of the present invention will become apparent as the description proceeds.

Briefly stated, the apparatus for supporting the test vehicle has a vertically floating piston with substantially frictionless means for regulating its oscillatory motion. Upon the piston lies self-adjusting, virtually frictionless bearings which transmit the weight of the test vehicle to the piston. Thus, the floating piston allows for any vertical motion of the test vehicle and the self-adjusting bearings allows for any horizontal translational and/or rotational motion.

This will be more readily understood by the following detailed description when taken together with the accompanying drawings in which.

Figure 1:
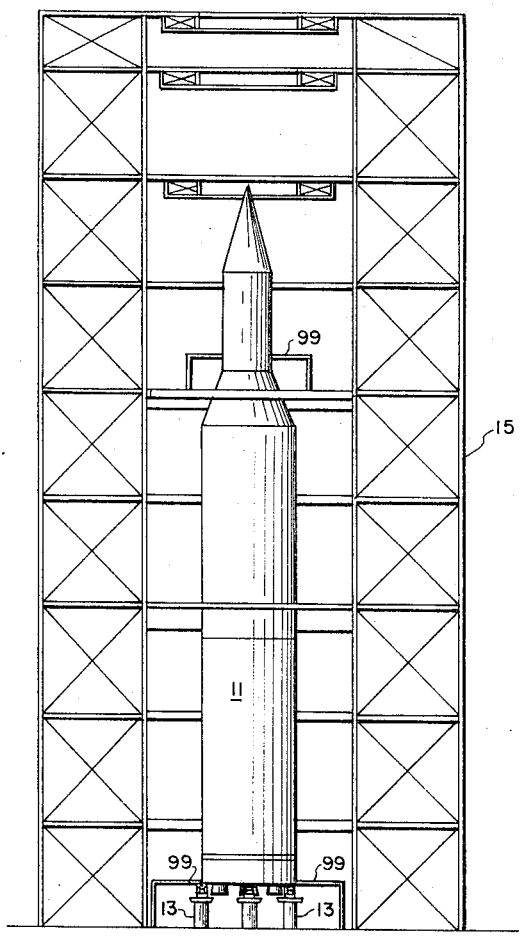
FIGURE 1 is an elevational view of a test vehicle supported upon the hydraulic supports of the present invention.

Referring now to FIGURE 1 which illustrates a test vehicle 11 supported upon self-adjusting hydraulic supports 13 of the present invention within a structural framework tower 15. As illustrated, four hydraulic supports 13 are symmetrically spaced about the aft end of the test vehicle 11 exemplified by a large multi-stage rocket.

Figure 2:
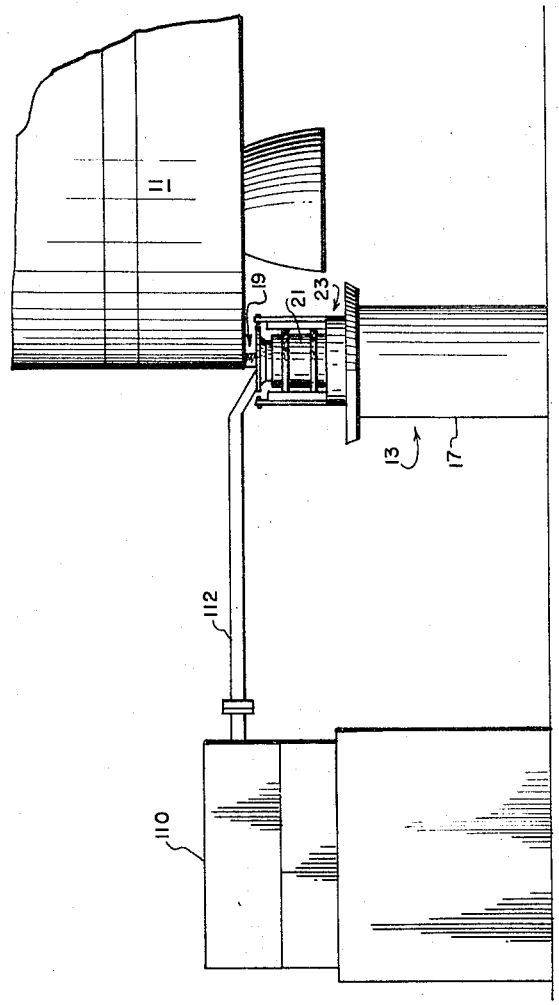
FIGURE 2 is an elevational view showing one of the supports of FIGURE 1 coupled to a shaker, the hydraulic lines removed for clarity.
Figure 3:
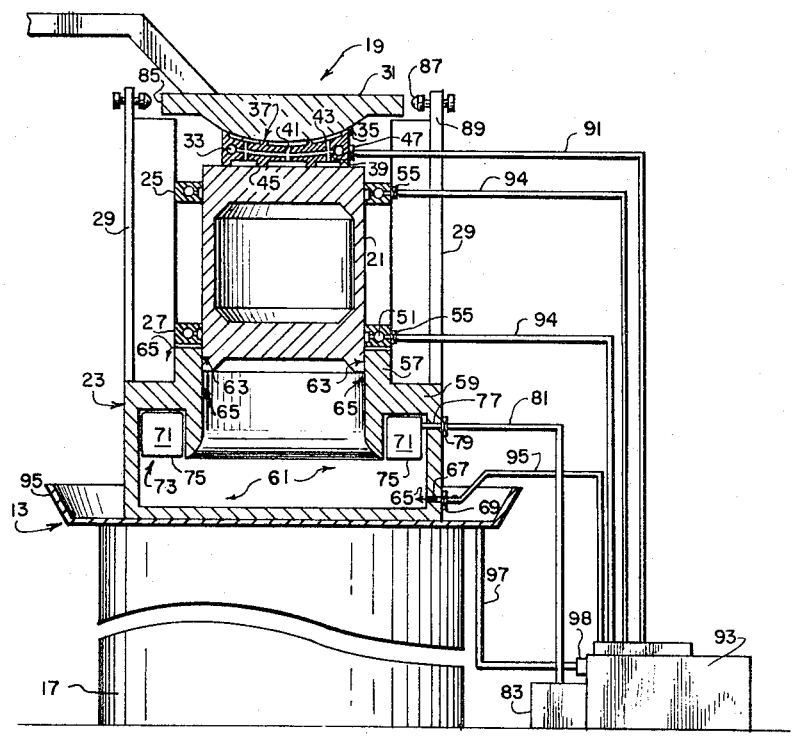
FIGURE 3 is a detailed elevational cross-sectional view of one of the hydraulic supports of FIGURE 1.

Each hydraulic support 13, shown best in FIGURES 2 and 3, functions independently of the other supports 13, and sits upon a foundation base 17.

The hydraulic support 13, essentially comprises a self-adjusting, hydrostatic bearing arrangement 19 supported upon a vertically floating piston 21.

The piston 21 reacts the same as a vertical spring because of its unique cylinder ring and oil-compression chamber arrangement 23 described in detail hereinafter. Two ring bearings 25 and 27 which are supported by stanchions 29 guide the piston 21 and assure its top surface is horizontal. The ring bearings 25 and 27 are the hydrostatic type and thus operate in a substantially frictionless manner.

Figure 4:
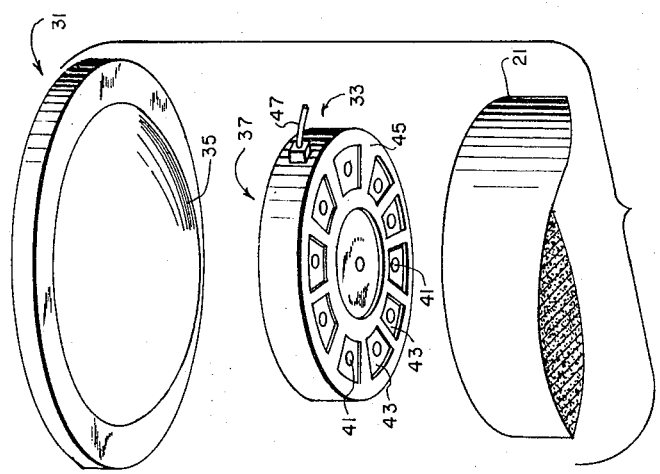
FIGURE 4 is an enlarged disassembled perspective view of the self-adjusting bearings of the support of FIGURE 1.

The self-adjusting bearings 19 are composed of an upper and a lower bearing 31 and 33, respectively, having mating spherical convex and concave surfaces 35 and 37, respectively, as illustrated by FIGURES 3 and 4. Thus, it is apparent that the vehicle 11 may be tilted about its transverse axis and the position of the lower bearing 33 is not disturbed because of the ability of the upper or pivot bearing 31 to slide and adjust within the concave recess 37 of the lower bearing 33.

The lower bearing 33 is provided with internal bores 39 which exit from nozzle openings 41 into hydrostatic lift pockets 43 within its top concave surface 37 as well as its bottom planar surface 45. An oil lubricant is supplied under pressure to the internal bores 39 through an adjustable, pressure-compensated flow control valve 47. The oil enters the pockets 43 within the top and bottom surfaces 37 and 45 of the lower bearing 33 and fills them so that the hydrostatic pressure will separate the opposed surfaces of the upper and lower bearings 31 and 33 as well as the opposed surfaces of the lower bearing 33 and the top of the piston 21. The oil fills out the gap formed by the separating surfaces and flows continuously therethrough. The oil exits from the gap and spills over the sides of the bearing 19 and piston 21.

The use of a thick oil film for a hydrostatic bearing is well known. The pressure of the oil during its passage through the gap lifts the test object 11 a few thousandths of one inch. Initially, the lift is only due to the pressurized pocket areas 43 but in free floating conditions, the whole pressurized surface area contributes to the lift. For the gap to be stable, the outlets of the ducts or bores 39 must be small enough to maintain a near constant flow of oil independent of the gap pressure. For example, a decreasing gap will increase the flow resistance of the gap but a constant flow will create higher gap pressures. The overall result is that the gap resists changes in its width and thus is quite stable.

Figure 5:
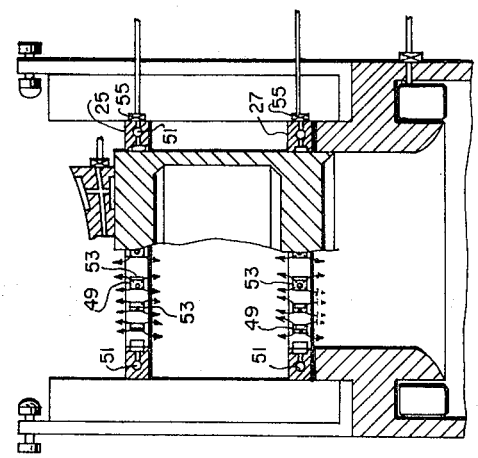
FIGURE 5 is a partial elevational cross-sectional view of one of the hydraulic supports of FIGURE 1 with portions broken away to reveal the piston bearings.

The two rings 25 and 27 used to guide the piston in its vertical movements also are the hydrostatic type and function similarly as the self-adjusting bearing arrangement 19. The inner surface of the rings 25 and 27 have a plurality of symmetrically spaced hydrostatic pockets 49, see FIGURE 5, and an internal duct system 51 which exits into a nozzle opening 53 within each pocket. The pressurized oil is delivered into the duct system 51 through an adjustable pressure-compensated valve 55. The nozzle 53 is designed to provide for a constant oil flow for each pocket 49 so the system will have good stability. While only one flow control valve 55 has been illustrated, it is apparent that the number of valves and the internal duct system may be easily modified so each pocket or some other select group of pockets may have a separate oil feed system.

As shown best in FIGURE 3 the piston 21 telescopes into a cylinder ring 57 defined by a housing 23 which has an enlarged bottom portion 59 forming an oil compression chamber 61. The contiguous surfaces of the piston 21 and cylinder ring 57 serve to form a capillary seal area 63.

A constant flow of oil as indicated by arrows 65 enters the oil compression chamber 61 through an inlet 67 within the enlarged bottom portion 59 having an adjustable flow control valve 69. The oil leaks through the capillary area 63 between the piston 21 and the cylinder ring 57, but because of the relative high flow resistance of the capillary area 63 the oil flow builds up a pressure beneath the piston 21. If the overlapping length 63 between the piston and cylinder increases, the flow resistance will also increase causing a greater build-up of pressure beneath the piston 21. As this increase of pressure hinders an increase in the overlapping length 63, the piston 21 is forced into an equilibrium position similarly to a spring.

The above reactions of the piston 21 occurs at a very slow speed characterized by a relative high time constant of several minutes for position changes caused by an external force.

However, since for any oscillatory motions, it is desirable to have a relative soft or low spring constant, a pocket of air or gas 71 is provided within the oil compression chamber 61 whereby the total volume of the oil and gas within the oil compression chamber 61 may change rapidly in response to oscillatory loads on the piston 21.

This is accomplished by having an annular pocket 73 within the upper portion of the chamber 61 in which a flexible container 75 is located. An inlet tube 77 with a pressure regulating valve 79 enters through the walls of the annular pocket 73 and of the flexible container 75 so air under pressure may be pumped into the flexible container 75. A hose 81 connects the valve 79 to a suitable pneumatic pump 83.

The flexible container 75 will prevent absorption of the gas 71 by the oil. By reducing the volume of the gas 71 by one-half, the spring constant will be doubled.

The upper bearing 31 is secured to the test vehicle 11 and has a circular projecting rim 85 forming its top surface. The projecting rim 85 extends over the stanchions 29 whose bottom end is secured to the housing 23 enclosing the oil compression chamber 61. The rim 85 of the upper bearing allows the test vehicle 11 to set directly on the vertical stanchions 29 without loading the self-adjusting bearings 19 and the piston 21. This is necessary during the test vehicle's installation or during a power failure.

Any toppling of the test vehicle 11 or sliding off the piston 21 is prevented by adjustable snubbers 87 which are threaded through the upper projecting flange 89 of the stanchions 29 so as to contact the projecting rim 85 of the upper bearing 31 and prevent any unusual movement.

The hydraulic line 91 to the valve 47 should be flexible so as not to interfere with the oscillatory motion of the test vehicle 11. The other hydraulic lines 94 and 95 to the valves 55 and 69 may be rigid.

As only one type of oil shall be circulated through the hydrostatic bearings 19, 25, and 27 and capillary seal 63 of the piston 21 and cylinder ring 57, a single oil pump 93 may be used to force the oil into the hydraulic lines.

In the case of a power failure, the inlet valve 69 for the oil flow into compression chamber 61 should close automatically so only the capillary area 63 is available as a passage. This will enable the test vehicle 11 to sink at a very slow rate down to the stanchions 29 and avoid any appreciable rebound force.

The overflow oil from the hydrostatic bearings 19, 25, and 27 and capillary seal 63 of the piston 21 is collected into an annular pan 95 projecting outwardly from the bottom of the cylinder ring housing 23. A tube 97 drains the oil through a filter 98 back to the pump 93 so the oil may be recirculated.

If the test object 11 is a multi-stage rocket as shown in FIGURE 1, two sets of hook-shape springs 99 should be provided, one at the upper level and hinged to the splice joint between the two stages and the other at the lower level near the support bearings 19. The flexing lever arms of the springs 99 will keep the vehicle 11 from leaning against the snubbers 87 during the dynamic testing. By using soft springs and placing them advantageously the reaction forces of the springs can be reduced considerably. Thus, their location should be near nodal points for dynamic bending tests.

An electromagnetic shaker 110 such as illustrated in FIGURE 2 could be used to impart the desired motions to the vehicle 11 during the dynamic test. The shaker 110 shown is electrically operated to give a push-pull motion to a rod 112 which is attached to the upper bearing 31.

The hydraulic support 13 of the present invention give "six degree" freedom of frictionless motion to the test vehicle 11. Any horizontal motion as well as rotational motion about the vertical is obtained by the self-adjusting bearings 19. The vertical motion is obtained by the use of the floating piston 21.

Thus, it is apparent that a novel support for the dynamic testing of space vehicles has been disclosed which substantially achieves free flight conditions. With this hydraulic support, the test vehicle loads the ground only and not a test tower or roof structure.

Obviously many modifications and variations of the present invention are possible in light of the above teachings. It is therefore to be understood that within the scope of the appended claims the invention may be practiced other than as specifically described.

What is claimed is:
1. A hydraulic support, comprising:
(a) a housing having an upper cylinder ring and a bottom portion defining an oil compression chamber;
(b) a piston telescoped within said cylinder ring so as to form a capillary seal area between their two contiguous surfaces, said seal area having sufficient clearance between the piston and the cylinder ring to allow oil to leak therethrough with a high flow resistance;
(c) means for producing a continuous flow of oil into said oil compression chamber so that the oil will build up pressure beneath the piston and leak through the capillary seal area;
(d) air chamber means within said compression chamber which allows the total volume of the oil and air within the compression chamber to change rapidly in response to oscillatory loads on the piston.

2. A hydraulic support as defined in claim 1, including:
   (a) hydrostatic ring bearing means for guiding the piston projecting from said cylinder ring.

3. A hydraulic support for use in the dynamic listing of space vehicles, comprising:
   (a) a housing having a cylinder ring and a bottom portion forming an oil compression chamber;
   (b) a piston telescoped within said cylinder ring;
   (c) said piston and cylinder ring forming a capillary leak area between their two contiguous surfaces;
   (d) means for producing a continuous flow of oil into said oil compression chamber so that the oil will build up pressure beneath the piston and leak through the capillary leak area;
   (e) a flexible container within said oil compression chamber; and
   (f) said enlarged bottom portion having an inlet communicating with said flexible container for admitting gas within said flexible container.

References Cited by the Examiner

UNITED STATES PATENTS

| | | | |
|---|---|---|---|
| 3,015,315 | 1/1962 | Strimel | 92—162 X |
| 3,226,103 | 12/1965 | McNenny | 188—96 X |

FOREIGN PATENTS 1,228,272  3/1960  France.

RICHARD C. QUIESSER, *Primary Examiner.*

J. W. MYRACLE, *Assistant Examiner.*